(12) United States Patent
Franke et al.

(10) Patent No.: US 6,581,570 B2
(45) Date of Patent: Jun. 24, 2003

(54) METHOD FOR CONTROLLING THE KNOCKING OF AN INTERNAL COMBUSTION ENGINE AND A CORRESPONDING DEVICE

(75) Inventors: Steffen Franke, Brentwood (GB); Siegmar Foerster, Oehringen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/976,794

(22) Filed: Oct. 12, 2001

(65) Prior Publication Data

US 2002/0073964 A1 Jun. 20, 2002

(30) Foreign Application Priority Data

Oct. 20, 2000 (DE) ......................... 100 51 974

(51) Int. Cl.[7] ............................................... F02P 5/152
(52) U.S. Cl. .............................. 123/406.21; 123/406.33
(58) Field of Search ...................... 123/406.21, 406.33; 701/111

(56) References Cited

U.S. PATENT DOCUMENTS

| 4,586,474 | A | * | 5/1986 | Akasu | 123/406.33 |
| 4,700,677 | A | * | 10/1987 | Bonitz et al. | 123/406.16 |
| 4,829,962 | A | * | 5/1989 | Hafner et al. | 123/406.33 |
| 5,000,150 | A | * | 3/1991 | Miyama et al. | 123/406.33 |
| 5,035,219 | A | * | 7/1991 | Ohkumo et al. | 123/406.33 |
| 5,243,942 | A | * | 9/1993 | Entenmann et al. | 123/406.33 |
| 5,645,034 | A | * | 7/1997 | Entenmann et al. | 123/406.33 |
| 5,771,862 | A | * | 6/1998 | Unland et al. | 123/406.33 |

FOREIGN PATENT DOCUMENTS

| DE | 40 08 170 | 9/1991 |
| DE | 195 32 504 | 3/1997 |

* cited by examiner

Primary Examiner—Tony M. Argenbright
(74) Attorney, Agent, or Firm—Kenyon & Kenyon

(57) ABSTRACT

A method for knock control of an internal combustion engine, in which values are provided by an adaptive characteristics map for retarding an ignition angle is proposed, the values of the adaptive characteristics map being assigned to at least one operating parameter. Upon occurrence of a dynamic in the at least one operating parameter, a characteristics map value (wkra) is read from the adaptive characteristics map as a function of the instantaneous value of the at least one operating parameter. In this context, a previous value for the ignition angle adjustment (wkr(old)) is only replaced by the characteristics map value (wkra) when the amount of the difference between the previous value for the ignition angle adjustment (wkr(old)) and the characteristics map value (wkra) is less than a predefinable ignition angle difference (KRDWAA) (|wkr(old)−wkra|<KRDWAA).

12 Claims, 2 Drawing Sheets

METHOD FOR CONTROLLING THE KNOCKING OF AN INTERNAL COMBUSTION ENGINE AND A CORRESPONDING DEVICE

FIELD OF THE INVENTION

The present invention relates to a method for adaptive knock control and a corresponding device.

BACKGROUND INFORMATION

German Published Patent Application No. 40 08 170 describes a characteristics map for the ignition angle retard that is used as a function of the operating parameters. When a specific characteristics map range is exited due to changes in the operating parameters, this characteristics map is then updated with the value of the ignition angle retard assumed prior to exiting the characteristics map range. If the operating parameters of the internal combustion engine change in such a manner that they correspond to a new characteristics map range for the ignition angle retard, the value already included in this new range is read out as the starting value for an ignition angle retard.

German Published Patent Application No. 195 32 504 describes a method in which, when a specific dynamic threshold in an operating parameter is exceeded, the characteristics map value of the new characteristics map range corresponding to the operating parameters is selected as the starting value for the ignition angle retard.

SUMMARY OF THE INVENTION

In contrast, the method according to the present invention and the corresponding device have the advantage that ignition angle jumps occurring as a result of a starting value being read out from a new characteristics map range under unfavorable conditions are minimized. Thus, there is only a minimal occurrence of torque jumps, which do not result in the loss of ride comfort.

Therefore, it is advantageous that the maximum allowable jump in the value of the ignition angle adjustment is actually achieved, because, as such, the ignition angle can be adapted as quickly as possible to the knock limit in this range. It is also advantageous to provide the load and the engine speed as operating parameters that are also subject to a dynamic, because these two operating parameters most directly describe the state of the internal combustion engine. It is equally advantageous to provide an additional ignition retard that is dependent upon the intensity of the dynamic. Thus, an additional knocking tendency of the internal combustion engine only occurring as a result of a strong dynamic can be countered. It is also advantageous that an adaptive characteristics map for ignition angle adjustment is provided for every cylinder, so that the ignition angle can be individually adjusted for each cylinder. Further advantages result from the following description.

DETAILED DESCRIPTION

Figure 1:
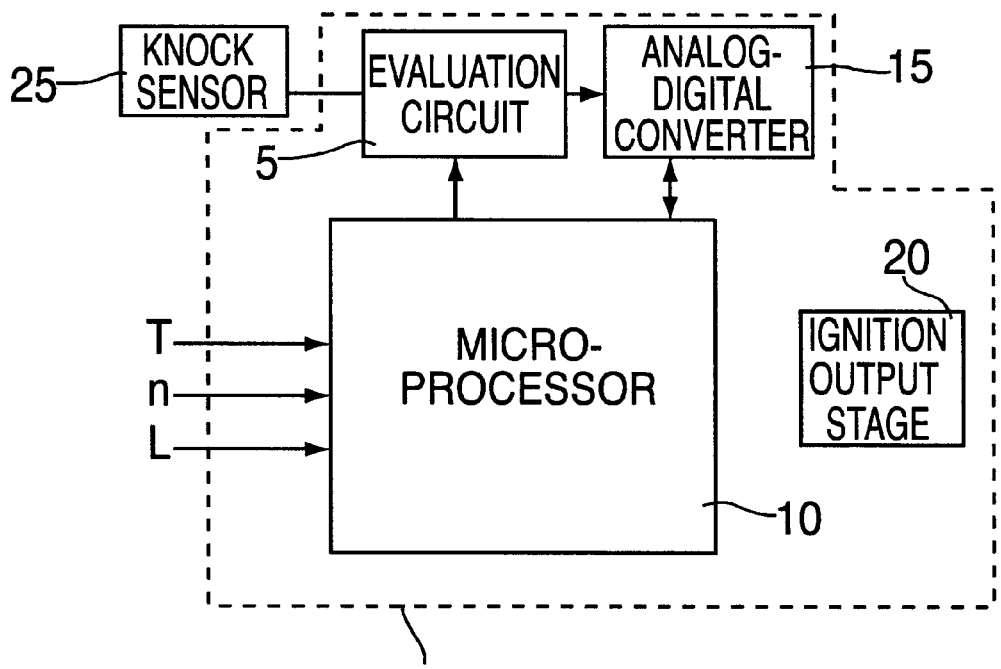
FIG. 1 schematically shows a device according to the present invention, for adaptive knock control in an internal combustion engine.

FIG. 1 schematically shows a block diagram for implementing the method according to the present invention, for adaptive knock control of an internal combustion engine. The internal combustion engine (not shown) is operated by a control unit 1 having a knock sensor evaluation circuit 5, an analog-digital converter 15, a microprocessor 10, and an ignition output stage 20. Present at the engine block of the internal combustion engine are one or more knock sensors 25, which are connected to knock sensor evaluation circuit 5, data being able to be transmitted from knock sensor 25 to knock sensor evaluation circuit 5 via the connection. Knock sensor evaluation circuit 5 is connected to microprocessor 10 via analog-digital converter 15. Different operating parameters of the internal combustion engine are also supplied to microprocessor 10. Thus, for example, load L, which is determined from the throttle valve position and/or the intake pipe pressure, engine speed n, which results from the rotational speed of the crankshaft or the camshaft, and/or temperature T, which includes the temperature of the coolant and/or the drawn-in air, are supplied to microprocessor 10. The signal acquired by knock sensor 25 and representing the engine noises is supplied to knock sensor evaluation circuit 5. In this evaluation circuit 5, the energy content of combustion noises recorded by the knock sensor is determined. This value is passed on via analog-digital converter 15 to microprocessor 10, in which the value is compared to a reference value to determine whether there is knocking. Given an occurrence of knocking, the ignition angle output from microprocessor 10 is shifted in the retard direction. If knocking no longer occurs after the ignition angle retard, the ignition angle can be subsequently returned in the advance direction, which corresponds to an approximation to the setpoint ignition angle output by the setpoint characteristics map. This knock control including the ignition angle adjustment is carried out by microprocessor 10. Microprocessor 10 calculates in each case from the existing, already indicated operating parameters a setpoint ignition angle, which receives ignition angle adjustment value $\Delta\alpha$, which is dependent upon the knock intensity. The total ignition angle resulting from the sum of the setpoint ignition angle and ignition angle adjustment value $\Delta\alpha$ is then outputted in the form of signals transmitted by microprocessor 10 to ignition output stage 20. Consequently, ignition output stage 20 initiates a charging of the ignition coil in the particular cylinder, and after the charging time is completed, firing is carried out in the respective cylinder at the ignition angle corresponding to the total ignition angle.

Figure 2:
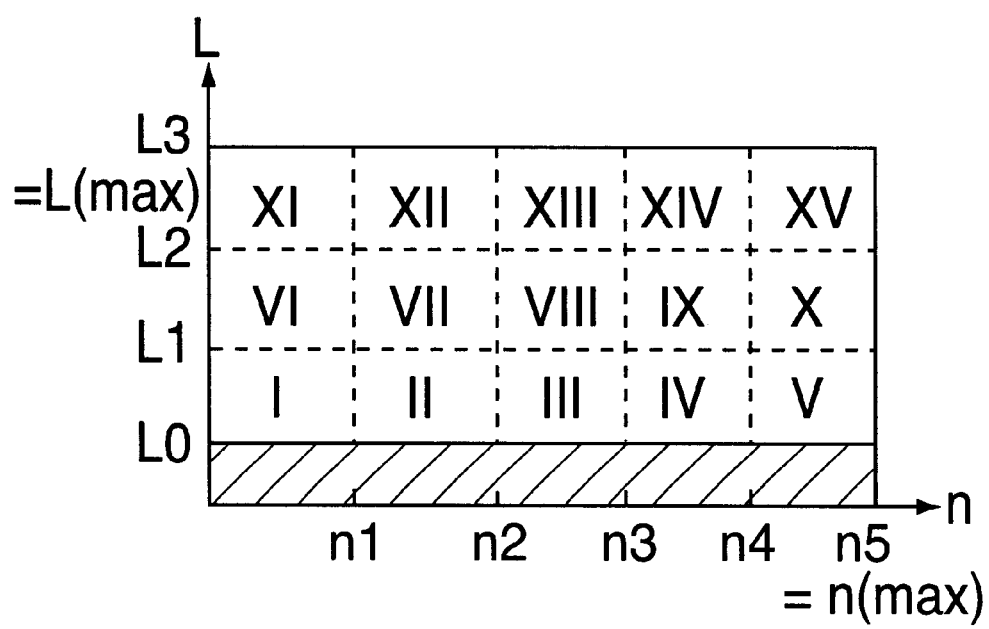
FIG. 2 schematically shows an adaptive characteristics map.

Ignition angle adjustment values $\Delta\alpha$ are stored in microprocessor 10 in an adaptable characteristics map for ignition angle retard. Such an adaptive characteristics map for ignition angle retard is schematically represented by FIG. 2. This adaptive characteristics map is subdivided into individual operating ranges as a function of load L and engine speed n. An ignition angle retard value $\Delta\alpha$ is stored for every operating range. For example, an operating range VII extends between engine speeds n1 and n2 and loads L1 and L2. An ignition angle retard value $\Delta\alpha_7$ is stored in this range. Upon exiting one operating range and reaching a new one, the ignition angle retard value of this new operating range is read out as the starting value for the ignition angle retard. The prevailing ignition angle retard value is stored for the exited operating range. In further exemplary embodiments, a value differing from the prevailing ignition angle retard value by an offset or another value obtainable from the prevailing ignition angle retard value is stored for the exited operating range. An exact description of the adaptable characteristics map for ignition angle retard can be taken from DE-OS 40 08 170.

Figure 3:
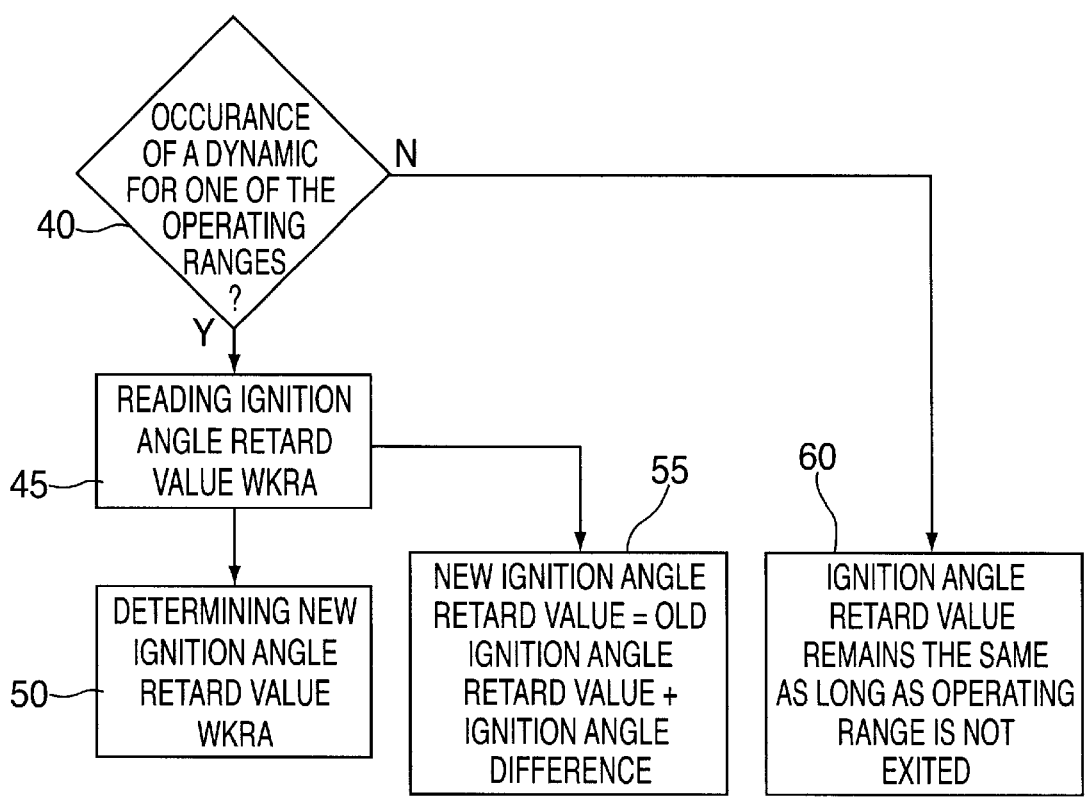
FIG. 3 schematically shows a method according to the present invention, for adaptive knock control in an internal combustion engine.

The functional sequence of the method according to the present invention, for adaptive knock control in an internal combustion engine will now be explained on the basis of FIG. 3. A step 40 checks whether there is an occurrence of a dynamic for one of the operating ranges, e.g., load L and/or engine speed n. This is then detected when the change in engine speed n and/or the change in load L is greater than an engine-speed dynamic threshold value or greater than a load dynamic threshold value within a certain period of time. If a dynamic is ascertained, the method is continued with step 45, an ignition angle retard value wkra being read from the adaptive characteristics map for ignition angle retard in this step. In this context, ignition angle retard value wkra is read from the characteristics map range corresponding to the instantaneous value of the operating parameter that addresses the adaptive characteristics map. The difference between ignition angle retard value wkr(old) used to date and ignition angle retard value wkra from the adaptive characteristics map is then also formed in step 45, i.e., wkr(old)−wkra. If the amount of this difference is less than a specific, predefinable ignition angle difference KRDWAA, the method continues with step 50, and ignition angle retard value wkra from adaptive characteristics map is determined as the new ignition angle retard value. If the amount of the difference between old ignition angle retard value wkr(old) and ignition angle retard value wkra from the adaptive characteristics map is greater than or equivalent to ignition angle difference KRDWAA, the method continues with step 55, and the new ignition angle retard value results from the sum of old ignition angle retard value wkr(old) and ignition angle difference KRDWAA. If no dynamic is ascertained in step 40, the method continues with step 60, in which the ignition angle retard value is not changed as long as the operating range is not exited. Steps 50, 55, and 60 are then followed by step 40.

In an additional exemplary embodiment, every cylinder of the internal combustion engine can be provided with its own adaptable characteristics map for ignition angle retard, so that an adaptable characteristics map can be used to carry out cylinder-specific knock control.

The method represented above can also be carried out using an adaptable characteristics map that is defined as a function of one or more than two operating parameters.

In a further exemplary embodiment, it is provided that when the dynamic in the operating parameters is very considerable, i.e., when, for example, the change in engine speed exceeds a threshold value for a very significant change in engine speed, or the change in load exceeds a threshold value for a very significant change in the load, an additional ignition angle retard wkrdy is provided that is take into consideration in addition to the ignition angle retard described above. In this context, dynamic retard value wkrdy is added to the total ignition angle.

The above-described method for adaptive knock control of an internal combustion engine as well as the corresponding device ensure that in the case of a dynamic of an internal combustion engine, in which, in some instances, there is a quick change in the operating ranges, significant torque fluctuations are prevented. As a result, juddering is prevented, and, as such, the drivability of the vehicle operated by the internal combustion engine is improved. In response to a change in environmental conditions, e.g. fueling the vehicle with a fuel of a different anti-knock quality, incorrect values that have not yet been adapted to the new environmental conditions are prevented from being read from not yet adapted characteristic map ranges for ignition angle retard, i.e., characteristic map ranges that have not yet been entered after the change in the environmental condition.

What is claimed is:

1. A method for controlling a knocking of an internal combustion engine, comprising the steps of:
    providing from an adaptable characteristics map a value for retarding an ignition angle;
    assigning the value to at least one operating parameter;
    reading a characteristics map value from the adaptable characteristics map as a function of an instantaneous value of the at least one operating parameter upon occurrence of a dynamic in the at least one operating parameter; and
    replacing a previous value for an ignition angle adjustment only by the characteristics map value when an amount of a difference between the previous value for the ignition angle adjustment and the characteristics map value is less than a predefinable ignition angle difference.

2. The method according to claim 1, wherein:
    the at least one operating parameter represents at least one of a load and an engine speed.

3. The method according to claim 1, further comprising the step of:
    detecting an occurrence of the dynamic when at least one of a change in load exceeds a predefinable load dynamic threshold value and a change in engine speed exceeds a predefinable engine-speed dynamic threshold value.

4. The method according to claim 1, further comprising the step of:
    replacing the previous value for the ignition angle adjustment with a sum of the previous value for the ignition angle adjustment and the predefinable ignition angle difference when the amount of the difference between the previous value for the ignition angle adjustment and the characteristics map value is no less than the predefinable ignition angle difference.

5. The method according to claim 1, further comprising the steps of:
    adapting for every cylinder the adaptable characteristics map; and
    reading the characteristics map value from the adaptable characteristics map of a respective one of each cylinder.

6. The method according to claim 1, further comprising the step of:
    adding a dynamic retard value to the previous value for the ignition angle adjustment when at least one dynamic operating parameter exceeds at least one threshold value.

7. A device for controlling a knocking of an internal combustion engine, comprising:
    a microprocessor for storing an adaptable characteristics map assigned to at least one operating parameter;
    an arrangement disposed in the microprocessor for reading, in response to a dynamic occurring in the at least one operating parameter, a characteristics map value for an ignition angle retard from the adaptable characteristics map as a function of an instantaneous value of the at least one operating parameter; and
    an arrangement for replacing a previous value for an ignition angle adjustment only with the characteristics map value when an amount of a difference between the previous value for the ignition angle adjustment and the characteristics map value is less than a predefinable ignition angle difference.

8. The device according to claim 7, wherein:

the at least one operating parameter represents at least one of a load and an engine speed.

9. The device according to claim 7, further comprising:

an arrangement for detecting an occurrence of the dynamic when at least one of a change in load exceeds a predefinable load dynamic threshold value and a change in engine speed exceeds a predefinable engine-speed dynamic threshold value.

10. The device according to claim 7, further comprising:

an arrangement for replacing the previous value for the ignition angle adjustment with a sum of the previous value for the ignition angle adjustment and the predefinable ignition angle difference when the amount of the difference between the previous value for the ignition angle adjustment and the characteristics map value no less than the predefinable ignition angle difference.

11. The device according to claim 7, further comprising:

an arrangement for adapting for every cylinder the adaptable characteristics map; and an arrangement for reading the characteristics map value from the adaptable characteristics map of a respective one of each cylinder.

12. The device according to claim 7, further comprising:

an arrangement for adding a dynamic retard value to the previous value for the ignition angle adjustment when at least one dynamic operating parameter exceeds at least one threshold value.

* * * * *